United States Patent
Lu et al.

(10) Patent No.: US 12,309,688 B2
(45) Date of Patent: May 20, 2025

(54) BLUETOOTH HUNTER AND METHOD FOR QUICK MATCHING OF SAME

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 731 days.

(21) Appl. No.: 17/420,810

(22) PCT Filed: Nov. 10, 2020

(86) PCT No.: PCT/CN2020/127779
§ 371 (c)(1),
(2) Date: Jul. 6, 2021

(87) PCT Pub. No.: WO2021/093725
PCT Pub. Date: May 20, 2021

(65) Prior Publication Data
US 2022/0078699 A1    Mar. 10, 2022

(30) Foreign Application Priority Data
Nov. 12, 2019    (CN) .......................... 201911102992.8

(51) Int. Cl.
*H04W 48/10* (2009.01)
*H04W 4/80* (2018.01)
(Continued)

(52) U.S. Cl.
CPC ............. *H04W 48/10* (2013.01); *H04W 4/80* (2018.02); *H04W 72/30* (2023.01); *H04W 76/14* (2018.02); *G08B 21/24* (2013.01)

(58) Field of Classification Search
CPC ........ G08B 21/24; H04W 4/80; H04W 48/10; H04W 76/14; H04W 4/06; H04W 48/16; H04W 72/30; H04W 8/005
See application file for complete search history.

(56) References Cited

U.S. PATENT DOCUMENTS 9,762,316 B2    9/2017  Kukulski et al.
2014/0334271 A1*  11/2014  Park .................. G01B 21/16
                                                 368/10
(Continued)

FOREIGN PATENT DOCUMENTS

CN    102148865 A    8/2011
CN    104540190 A    4/2015
(Continued)

OTHER PUBLICATIONS

Office Action issued on Feb. 2, 2021 in corresponding Chinese application No. 201911102992.8; 8 pages.
(Continued)

*Primary Examiner* — Liton Miah
(74) *Attorney, Agent, or Firm* — Maier & Maier, PLLC

(57) ABSTRACT

A Bluetooth hunter and a method for quick matching of the same, which belongs to the communication field. The method includes: the mobile terminal obtains device identification and clicking identification from the broadcast data package of the Bluetooth hunter, and determines whether the device identification of the Bluetooth hunter is stored in itself, if yes, obtains the clicking identification of the Bluetooth hunter stored in itself according to the device identification; and the mobile terminal sends a matching instruction to the Bluetooth hunter and matches with the Bluetooth hunter when the mobile terminal determines that the clicking identification of the Bluetooth obtained from itself is differ- (Continued)

ent from the clicking identification obtained from the broadcast data package of the Bluetooth hunter.

13 Claims, 9 Drawing Sheets

(51) Int. Cl.
*H04W 72/00* (2023.01)
*H04W 72/30* (2023.01)
*H04W 76/14* (2018.01)
*G08B 21/24* (2006.01)

(56) References Cited

U.S. PATENT DOCUMENTS

| | | | | |
|---|---|---|---|---|
| 2015/0208141 A1* | 7/2015 | Kim | ................ | G08C 17/02 340/870.07 |
| 2015/0249918 A1* | 9/2015 | Li | ................ | H04L 9/0869 380/270 |
| 2017/0286039 A1* | 10/2017 | Liu | ................ | G02B 27/017 |
| 2021/0133524 A1* | 5/2021 | Xu | ................ | G06Q 20/354 |

FOREIGN PATENT DOCUMENTS

| | | | | |
|---|---|---|---|---|
| CN | 104581331 A | | 4/2015 | |
| CN | 104637262 A | | 5/2015 | |
| CN | 104918208 A | | 9/2015 | |
| CN | 105100856 A | | 11/2015 | |
| CN | 106454713 A | * | 2/2017 | ............ H04W 4/80 |
| CN | 107155123 A | | 9/2017 | |
| CN | 108632796 A | | 10/2018 | |
| CN | 110677823 A | | 1/2020 | |
| WO | WO-2019119620 A1 | * | 6/2019 | ............ H04B 5/00 |

OTHER PUBLICATIONS

International Search Report issued on Feb. 7, 2021 in corresponding International application No. PCT/CN2020/127779; 7 pages.

* cited by examiner

BLUETOOTH HUNTER AND METHOD FOR QUICK MATCHING OF SAME

CROSS-REFERENCE TO RELATED APPLICATIONS

This application is a national stage of International Application No. PCT/CN2020/127779, filed on Nov. 10, 2020, which claims priority to Chinese Patent Application No. 201911102992.8, filed to the China National Intellectual Property Administration on Nov. 12, 2019 and entitled "Bluetooth Hunter and Method for Quick Matching of Same". Both of the aforementioned applications are hereby incorporated by reference in their entireties.

TECHNICAL FIELD

The present disclosure relates to the field of communication technology and, in particular, to a Bluetooth hunter and a method for quick matching of same.

BACKGROUND

A Bluetooth hunter is a hunting device which is specially designed for a mobile terminal, and it is popular because it has the advantages of small volume, low power consumption, easy to carry, and two-way searching for items. Users often buy several Bluetooth hunters of the same type at the same time and hang them on different items to quickly find them.

Generally speaking, the Bluetooth hunters of same type have same design and name displayed on a list of a mobile terminal, and only the sequence numbers are difference. When wanting the mobile terminal to match with one Bluetooth hunter, the user needs to observe the sequence number of printing on the Bluetooth hunter, and then search for the Bluetooth hunter corresponding to the sequence number in the list and matches with the Bluetooth hunter.

This operation not only brings great inconvenience to the user and reduces the user's experience, but also increases production cost since a process of printing sequence numbers on the Bluetooth hunter is complicate.

SUMMARY

To solve the existing problem in the prior art, the present disclosure provides a Bluetooth hunter and a method for quick matching of same.

The technical solution adopted by the present disclosure is as follows:

according to a first aspect, the present disclosure provides a method for quick matching of a Bluetooth hunter, which is applied to a mobile terminal and includes following steps:

step S1, obtaining, by the mobile terminal, broadcasting data package of the Bluetooth hunter in a first preset scope, and obtaining device identification and clicking identification from the broadcast data package;

step S2, determining, by the mobile terminal, whether the device identification is stored in itself, if yes, executing step S3; otherwise, executing step S4;

step S3, searching for, by the mobile terminal, and obtaining the clicking identification, which is stored in itself, corresponding to the device identification, and executing step S5;

step S4, storing, by the mobile terminal, the device identification and the clicking identification correspondingly which are obtained from the broadcast data package, and returning to step S1;

step S5, determining, by the mobile terminal, whether the clicking identification obtained from the broadcast data package is same as the clicking identification, which is stored in itself, corresponding to the device identification, if yes, returning to step S1; otherwise, executing step S6; and step S6, sending, by the mobile terminal, a matching instruction to the Bluetooth hunter, and matching with the Bluetooth hunter.

According to a second aspect, the present disclosure provides a method for quick matching of a Bluetooth hunter which is applied to the Bluetooth hunter and includes following steps:

step M1, sending, by the Bluetooth hunter, broadcast data package which includes device identification and clicking identification of the Bluetooth hunter to outside;

step M2, updating the clicking identification of the Bluetooth hunter when the Bluetooth hunter is triggered;

step M3, sending, by the Bluetooth hunter, the broadcasting data package which includes device identification of the Bluetooth hunter and updated clicking identification to outside; and step M4, matching, by the Bluetooth hunter, with a mobile terminal when the Bluetooth hunter receives a matching instruction sent from the mobile terminal.

According to a third aspect, the present disclosure provides a mobile terminal which is applied to a Bluetooth hunter, including:

a first obtaining module, configured to obtain broadcast data package of the Bluetooth hunter within a first preset scope;

a second obtaining module, configured to obtain device identification and clicking identification from the broadcast data package of the Bluetooth hunter obtained by the first obtaining module;

a first determining module, configured to determine whether the mobile terminal stores the device identification, if yes, to trigger an inquiring module; otherwise, to trigger a storage module;

the inquiring module, configured to search for the clicking identification corresponding to the device identification which is stored in itself, and to trigger a third obtaining module;

the third obtaining module, configured to obtain the clicking identification corresponding to the device identification when the inquiring module inquires the clicking identification corresponding to the device identification;

the storage module, configured to store the device identification and the clicking identification correspondingly obtained from the broadcast data package, and to trigger the first obtaining module;

a second determining module, configured to determines whether the clicking identification obtained from the broadcast data package is same as the clicking identification corresponding to the device identification which is stored in itself, if yes, to trigger the first obtaining module; otherwise, to trigger a matching module; and the matching module, configured to send a matching instruction to the Bluetooth hunter, and to match with the Bluetooth hunter.

According to a fourth aspect, the present disclosure provides a Bluetooth hunter, including:

a first sending module, configured to send a broadcast data package which includes device identification and clicking identification of the Bluetooth hunter to outside;

a triggering module, configured to receive triggering from outside;

an updating module, configured to update the clicking identification of the Bluetooth hunter when the triggering module receives triggering from outside;

a second sending module, configured to send broadcast data package which includes the device identification of the Bluetooth hunter and an updated clicking identification to outside;

a receiving module, configured to receive a matching instruction sent from the mobile terminal; and a matching module, configured to match the Bluetooth hunter with the mobile terminal when the receiving module receives the matching instruction sent from the mobile terminal.

Compared with the prior art, the present disclosure has following advantages: according to the present disclosure, it provides a method for quick matching of a Bluetooth hunter, where a mobile terminal can determines automatically whether it matches with the Bluetooth hunter by the Bluetooth hunter updating the clicking identification in the broadcast data package, and there is no need for a use to filter manually, thus the method is smarter, more convenient, saves the user's time, and improves user experience. Meantime, the method does not require the user to observe a sequence number of the Bluetooth hunter which is being bond, thus, the vendor of the Bluetooth hunter does not need to print the sequence number on the Bluetooth hunter, thereby saving production costs.

DETAILED DESCRIPTION OF THE EMBODIMENTS

In order to make the objectives, technical solutions, and advantages of the present disclosure clearer, the following further describes the implementations of the present disclosure in detail with reference to the accompanying drawings.

Embodiment 1

Figure 1:
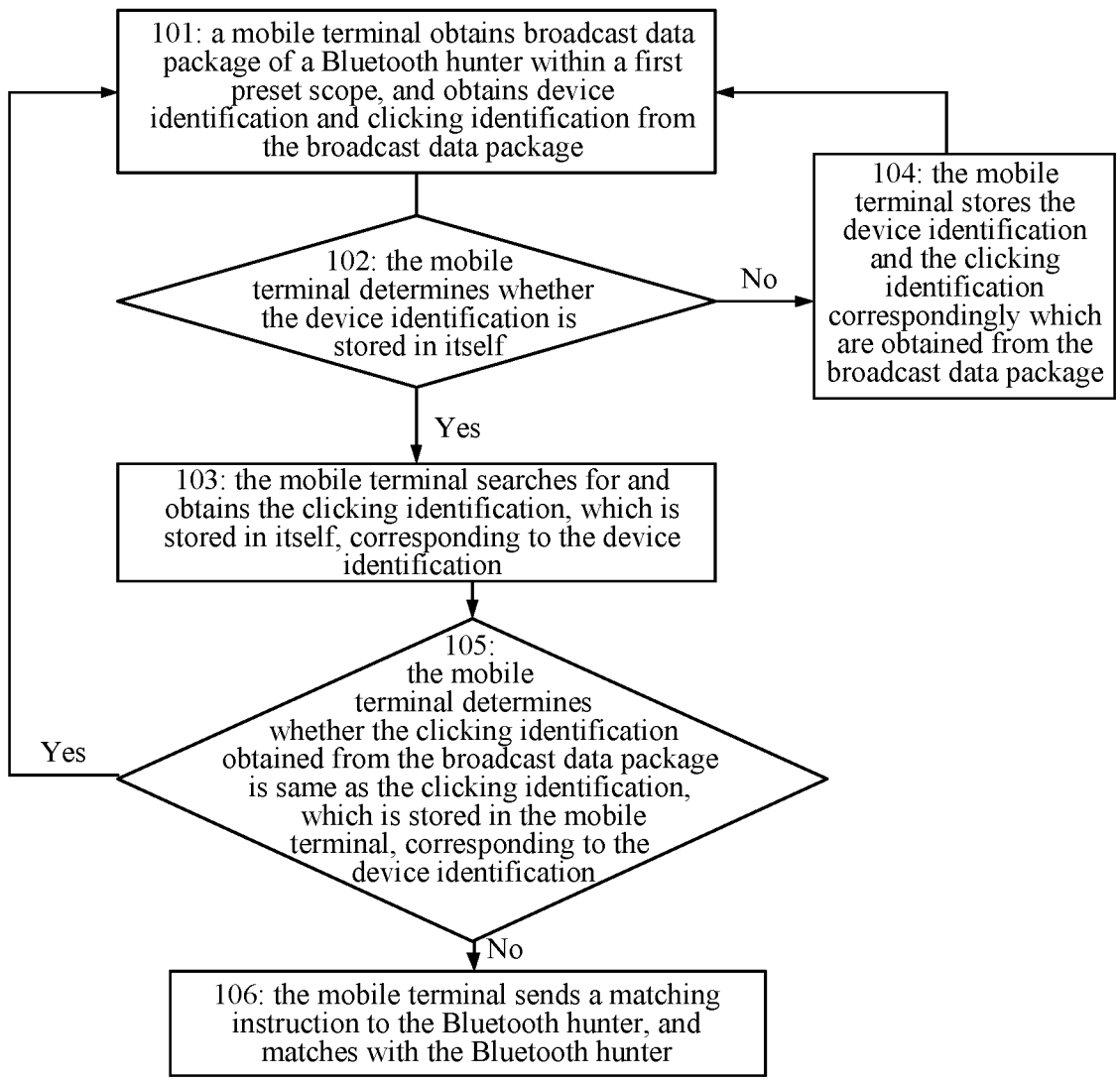
FIG. 1 is a flowchart of a method for quick matching of a Bluetooth hunter according to Embodiment 1 of the present disclosure.

According to Embodiment 1, it provides a method for quick matching of a Bluetooth hunter, which is applied to a mobile terminal, as shown in FIG. 1, the method includes following steps:

step 101, the mobile terminal obtains broadcast data package of a Bluetooth hunter within a first preset scope, and obtains device identification and clicking identification from the broadcast data package;

preferably, in Embodiment 1, the device identification and the clicking identification are numbers of hexadecimal;

preferably, step 101 is specifically that the mobile terminal obtains data defined by a vendor from the broadcast data package of the Bluetooth hunter, and the mobile terminal obtains the device identification and the clicking identification of the Bluetooth hunter from the data defined by the vendor;

specifically, the device identification of the Bluetooth hunter is configured to indicate the mobile terminal to search whether the clicking identification corresponding to the device identification is stored in the mobile terminal; and the clicking identification of the Bluetooth hunter is configured to indicate the number of times of the Bluetooth hunter being triggered after the Bluetooth hunter is turned on.

Optionally, the mobile terminal obtaining the device identification of the Bluetooth hunter from the data defined by the vendor is specifically that the mobile terminal obtains data on the second preset byte from the data defined by the vendor;

optionally, the mobile terminal obtaining the clicking identification of the Bluetooth hunter from the data defined by the vendor is specifically that the mobile terminal obtains data on the third preset byte from the data defined by the vendor; and specifically, the data defined by the vendor is data predefined by the Bluetooth hunter vendor according to need.

Preferably, in Embodiment 1, if data on the first nine bytes of the data defined by the vendor is the second preset byte data, the mobile terminal obtaining the device identification from the broadcast data package of the Bluetooth hunter is specifically that the mobile terminal obtains data on the first nine bytes of the data defined by the vendor from the broadcast data package of the Bluetooth hunter;

preferably, in Embodiment 1, if the data on the last byte of the data defined by the vendor is the third preset byte data, the mobile terminal obtaining the clicking identification of the Bluetooth hunter from the broadcast data package of the Bluetooth hunter is specifically that the mobile terminal obtains the data on the last byte of the data defined by the vendor from the broadcast data package of the Bluetooth hunter;

optionally, the device identification can not only be the data on the first nine bytes of the data defined by the vendor, but also can be data on other bytes, such as data from the third byte to the eleventh byte; and optionally, the length of the device identification is not limit to nine bytes, for instance, the length can be twelve bytes.

Optionally, the clicking identification is not limit to the data on the last byte of the data defined by the vendor, can also be data on other byte, for instance, the data on the tenth byte; and optionally, the length of the clicking identification is not limit to one byte, for instance, the length is two bytes.

Optionally, in Embodiment 1, before step 101, the method further includes the mobile terminal obtains the broadcast data package of the Bluetooth hunter within the first preset scope.

Specifically, the mobile terminal obtaining the broadcast data package within the first preset scope specifically includes:

step A1, the mobile terminal obtains the broadcast data package within the first preset scope; and step A2, the mobile terminal determines whether the broadcast data package is from the Bluetooth hunter, if yes, executes step 101; otherwise, returns to step A1.

Optionally, before step A1, the method further includes:

step B1, the mobile terminal determines whether its own Bluetooth function is turned on, if yes, executes step A1; otherwise, executes step B2; and step B2, the mobile terminal prompts the user to turn on the Bluetooth function, and returns to step B1.

step 102, the mobile terminal determines whether the device identification is stored in itself, if yes, executes step 103; otherwise, executes step 104;

optionally, the device identification of the Bluetooth hunter is stored in the data dictionary of the mobile terminal;

optionally, step 102 is specifically that the mobile terminal searches in the data dictionary according to the device identification obtained from the broadcast data package of the Bluetooth hunter, the Bluetooth hunter is not scanned for the first time if the device identification of the Bluetooth hunter has already been stored in the data dictionary, and executes step 103; and the Bluetooth hunter is scanned for the first time if the device identification of the Bluetooth hunter is not stored in the data dictionary, and executes step 104;

step 103, the mobile terminal searches for and obtains the clicking identification, which is stored in itself, corresponding to the device identification, and executes step 105;

optionally, the clicking identification of the Bluetooth hunter is stored in the data dictionary of the mobile terminal;

optionally, the storage manner of the device identification and the clicking identification in the data dictionary is key value pair storage manner; where the device identification is stored in a key name catalogue, and the clicking identification is stored under the catalogue of a value corresponding to the key name. In data dictionary, the clicking identification corresponding to the device identification can be obtained via searching for the device identification;

optionally, step 103 further includes that the mobile terminal determines whether the clicking identification corresponding to the device is stored in the data dictionary, if yes, executes step 103; otherwise, mobile terminal reports error, and ends the procedure;

step 104, the mobile terminal stores the device identification and the clicking identification correspondingly which are obtained from the broadcast data package, and returns to step 101;

optionally, the mobile terminal stores the device identification and the clicking identification obtained from the broadcast data package into the data dictionary;

step 105, the mobile terminal determines whether the clicking identification obtained from the broadcast data package is same as the clicking identification, which is stored in the mobile terminal, corresponding to the device identification, if yes, returns to step 101; otherwise, executes step 106;

specifically, when wanting to match the mobile terminal with a Bluetooth hunter, the user can trigger the Bluetooth hunter via clicking or touching, and the Bluetooth hunter updates the current clicking identification in the broadcast data package when the Bluetooth hunter is triggered;

specifically, the mobile terminal determines whether the clicking identification obtained from the broadcast data package is an updated clicking identification via comparing the clicking identification obtained from the data dictionary with the clicking identification obtained from the broadcast data package; if the clicking identification obtained from the data dictionary is same as the clicking identification obtained from the broadcast data package, the clicking identification obtained from the broadcast data package is not the clicking identification which is updated, and the Bluetooth hunter scanned by the mobile terminal is not the Bluetooth hunter that the user wants to match with, and returns to step 101; if the clicking identification obtained from the data dictionary is different from the clicking identification obtained from the broadcast data package, the clicking identification obtained from the broadcast data package is the clicking identification which is updated, the Bluetooth hunter scanned by the mobile terminal is the Bluetooth hunter that the user wants to match with, and executes step 106; and step 106, the mobile terminal sends a matching instruction to the Bluetooth hunter, and matches with the Bluetooth hunter.

Compared with the prior art, the present disclosure has following advantages: according to the present disclosure, it provides a method for quick matching of a Bluetooth hunter, where a mobile terminal can determines automatically whether it matches with the Bluetooth hunter by the Bluetooth hunter updating the clicking identification in the broadcast data package, and there is no need for a use to filter manually, thus the method is smarter, more convenient, saves the user's time, and improves user experience. Meantime, the method does not require the user to observe a sequence number of the Bluetooth hunter which is being bond, thus, the vendor of the Bluetooth hunter does not need to print the sequence number on the Bluetooth hunter, thereby saving production costs.

Embodiment 2

Figure 2A:
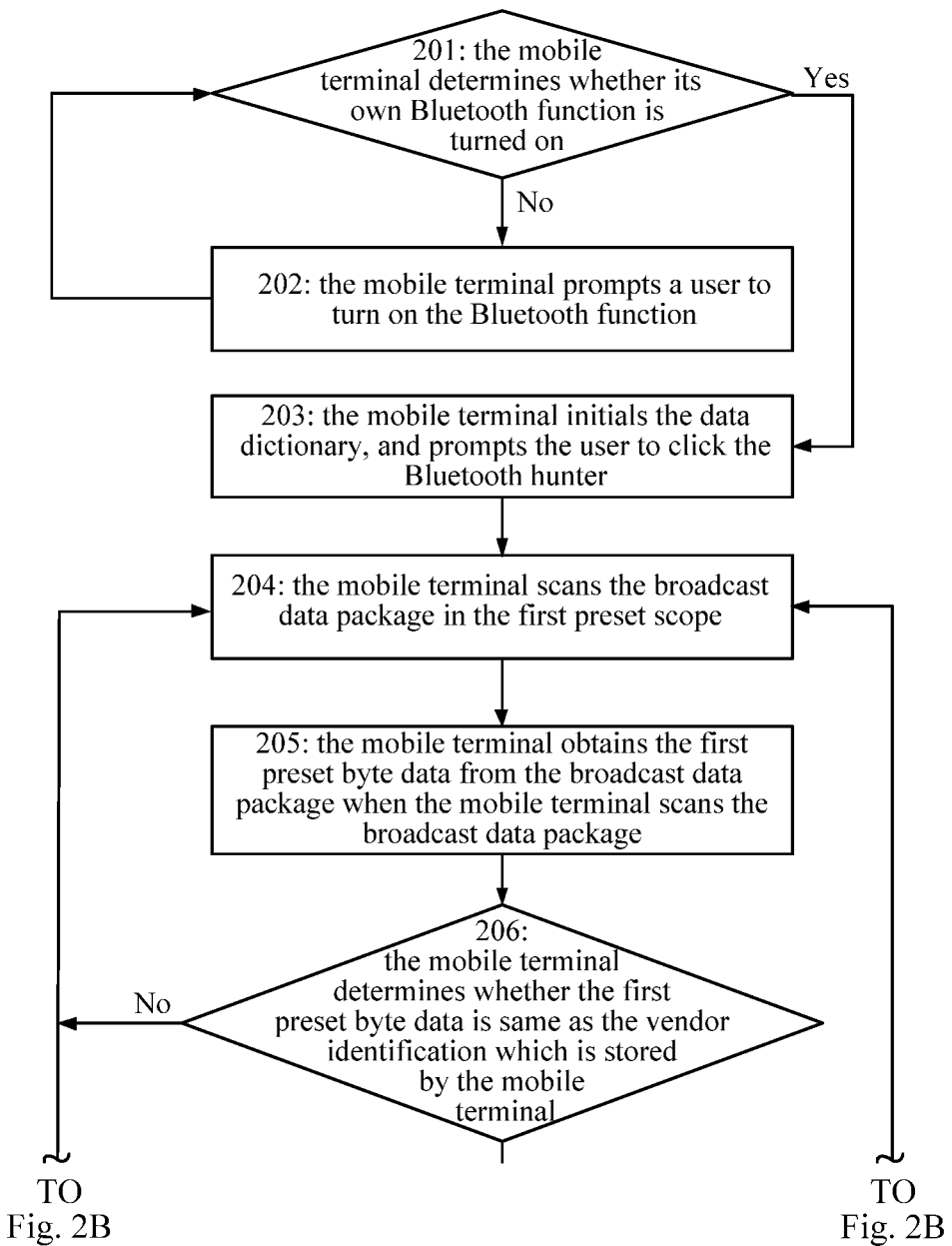
FIGS. 2A-2B are flowcharts of a method for quick matching of a Bluetooth hunter according to Embodiment 2 of the present disclosure.
Figure 2B:
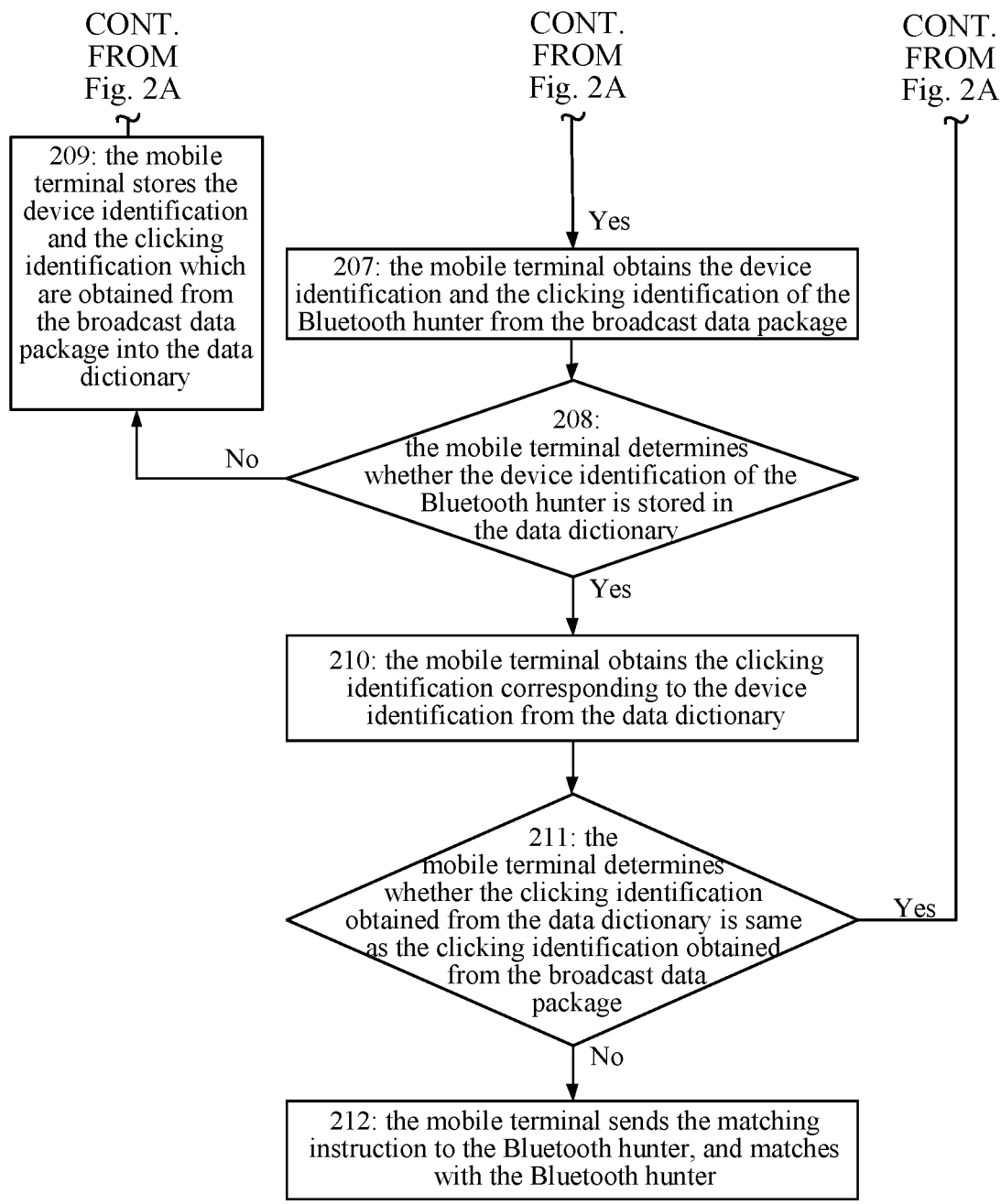

According to Embodiment 2, it provides a method for quick matching of a Bluetooth hunter, which is applied to a mobile terminal, as shown in FIGS. 2A-2B, the method includes following steps:

step 201, the mobile terminal determines whether its own Bluetooth function is turned on, if yes, executes step 203; otherwise, executes step 202;

optionally, step 201 is specifically that the mobile terminal determines whether its own Bluetooth function is turned on according to Bluetooth state information returned by the first preset function, executes step 203 if the information returned is turning on state information; and executes step 202 if the returned information is closing state information;

for instance, in Embodiment 2, the first preset function is -(void)centralManagerDidUpdateState;

the turning on state information is CBManagerStatePoweredOn;

the closing state information is CBManagerStatePoweredOff;

step 202, the mobile terminal prompts a user to turn on the Bluetooth function;

optionally, the mobile terminal can prompt the user to turn on the Bluetooth function via ways such as popping prompt message or sending out warning sound;

optionally, in Embodiment 2, the mobile terminal prompts the user to turn on the Bluetooth function via popping up a prompt message;

step 203, the mobile terminal initials the data dictionary, and prompts the user to click the Bluetooth hunter;

specifically, the data dictionary is used to store the device identification and the clicking identification of the Bluetooth hunter, the data structure of the data dictionary is the data structure of key value pair, in the data structure of key value pair, the corresponding value can be searched according to the key name; where the device identification of the Bluetooth hunter is stored under the key name catalogue, the clicking identification of the Bluetooth hunter is stored under the catalogue of value corresponding to the key name, in data dictionary, the clicking identification corresponding to the device identification can be obtained by searching for the device identification;

step 204, the mobile terminal scans the broadcast data package in the first preset scope;

specifically, the first preset scope is an effective distance of the Bluetooth communication, and the mobile terminal cannot scan the broadcast data package sent from the Bluetooth device when the distance between the Bluetooth device and the mobile terminal beyond the first preset scope;

optionally, in Embodiment 2, the mobile terminal obtaining the broadcast data package from the first preset scope is specifically that the mobile terminal invokes a Bluetooth scanning data interface, sets scanning parameter as null, and obtains the broadcast data package within the first preset scope;

optionally, the mobile terminal can obtain broadcast data package sent from any Bluetooth device when the mobile terminal sets the scanning parameter as null;

for instance, the Bluetooth scanning data interface in Embodiment 2 is -(void)scanForPeripheralsWithServices:(nullableNSArray<CBUUID *> *)serviceUUIDs options:(nullable NSDictionary<NSString *, id> *)options;

step 205, the mobile terminal obtains the first preset byte data from the broadcast data package when the mobile terminal scans the broadcast data package;

optionally, the first preset byte data is in the data defined by the vendor within the broadcast data package;

optionally, in Embodiment 2, the first preset byte data is specifically the data from the first byte to the third byte of the data defined by the vendor within the broadcast data package; the mobile terminal obtaining the first preset byte data is specifically that the mobile terminal obtains data from the first byte to the third byte of the data defined by the vendor in the broadcast data package, and marks the data as the first preset byte data;

for instance, the data defined by the vendor is 43544B4764E08EA8834764E08EA88301;

the first preset byte data is 43544B;

step 206, the mobile terminal determines whether the first preset byte data is same as the vendor identification which is stored by the mobile terminal, if yes, executes step 207; otherwise, returns to step 204;

specifically, the vendor identification is a group of data which is defined by the Bluetooth hunter vendor, which is configured to distinguish model numbers of the Bluetooth hunters, and the vendor identification of the Bluetooth hunters of same model number is same as each other;

optionally, in Embodiment 2, step 206 is specifically that the mobile terminal obtains the vendor identification which is stored by itself, compares the obtained vendor identification with the first preset byte data obtained from the broadcast data package, executes step 207 if the vendor identification which is stored by itself is same as the first preset byte data obtained from the broadcast data package; otherwise, returns to step 204;

optionally, in Embodiment 2, the mobile terminal determines whether the Bluetooth broadcast package which is scanned is from the Bluetooth hunter by determining whether the first preset byte data is same as the vendor identification stored by itself; if the vendor identification stored by itself is same as the first preset byte data obtained from the broadcast data package, the Bluetooth broadcast package which is scanned is from the Bluetooth hunter; otherwise, the Bluetooth broadcast package which is scanned is not from the Bluetooth hunter;

optionally, in Embodiment 2, the mobile terminal determining whether the first preset byte data is same as the vendor identification stored by itself is specifically that the mobile terminal compares the vendor identification with the first preset byte data via invoking the second preset function, and returns a compared result to the mobile terminal, if the compared result returned is that the vendor identification is same as the first preset byte data, the Bluetooth broadcast package which is scanned is from the Bluetooth hunter, and step 207 is executed; otherwise, the Bluetooth broadcast package is not from the Bluetooth hunter, and step 204 is returned to;

for instance, the vendor identification is 43544B, the vendor identification is same as the first preset byte data if the first preset byte data is 43544B, and the Bluetooth broadcast package which is scanned is from the Bluetooth hunter; and the vendor identification is different from the first preset byte data if the first preset byte data is 43234B, and the Bluetooth broadcast package which is scanned is not from the Bluetooth hunter;

for instance, in Embodiment 2, the second preset function is -(BOOL)isEqualToString:(NSString *)aString;

for instance, the broadcast data package which is scanned is from the Bluetooth hunter if the compared result which is returned is YES; and the broadcast data package which is scanned is not from the Bluetooth hunter if the compared result returned is NO;

step 207, the mobile terminal obtains the device identification and the clicking identification of the Bluetooth hunter from the broadcast data package;

optionally, step 207 is specifically that the mobile terminal obtains data defined by the vendor from the broadcast data package, and obtains the second preset byte data from the data defined by the vendor and marks the second preset byte data as the device identification; and obtains the third preset byte data from the data defined by the vendor and marks the third preset byte data as the clicking identification;

optionally, in Embodiment 2, both of the device identification and the clicking identification are numbers of sexadecimal, the length of the device identification is nine bytes, and the length of the clicking identification is one byte;

optionally, in Embodiment 2, the second preset byte data is the data from the first byte to the ninth byte which is defined by the vendor, and the device identification is data from the first byte to the ninth byte which is defined by the vendor;

optionally, in Embodiment 2, the mobile terminal obtaining the device identification from the broadcast data package is specifically that the mobile terminal obtains the data from the first byte to the ninth byte of the data which is defined by the vendor in the broadcast data package;

for instance, the data defined by the vendor is 43544B4764E08EA8834764E08EA88301;

the device identification is 43544B4764E08EA883;

optionally, in Embodiment 2, the third preset byte data is the data on the last byte of the data defined by the vendor, thus the clicking identification is the data on the last byte of the data defined by the vendor;

optionally, in Embodiment 2, the mobile terminal obtaining the clicking identification from the broadcast package is specifically that the mobile terminal obtains the data on the last byte of the data which is defined by the vendor from the broadcast data package;

for instance, the data field defined by the vendor is 43544B4764E08EA8834764E08EA88301;

the clicking identification is 01;

step 208, the mobile terminal determines whether the device identification of the Bluetooth hunter is stored in the data dictionary, if yes, executes step 210; otherwise, executes step 209;

optionally, step 208 is specifically that the mobile terminal searches from the data dictionary according to the device identification obtained from the broadcast data package, and determines whether the device identification of the Bluetooth hunter is stored in the data dictionary, if yes, executes step 210; otherwise, executes step 209;

step 209, the mobile terminal stores the device identification and the clicking identification which are obtained from the broadcast data package into the data dictionary, and returns to step 204;

optionally, in Embodiment 2, the data dictionary is used to store the device identification and the clicking identification of the Bluetooth hunter, the storage manner of the device identification and the clicking identification of the Bluetooth hunter in the data dictionary is key value pair storage manner; where the device identification is stored under the key name catalog, the clicking identification is stored under the value catalog corresponding to the key name, in the data dictionary, the clicking identification corresponding to the device identification can be obtained via searching for the device identification;

step 210, the mobile terminal obtains the clicking identification corresponding to the device identification from the data dictionary;

optionally, before step 210, the method further includes: the mobile terminal determines whether the data dictionary stores the clicking identification corresponding to the device identification, if yes, executes step 210; otherwise, the mobile terminal reports and error, and ends the procedure;

step 211, the mobile terminal determines whether the clicking identification obtained from the data dictionary is same as the clicking identification obtained from the broadcast data package, if yes, returns to step 204; otherwise, executes step 212;

optionally, in Embodiment 2, step 211 is specifically that the mobile terminal determines whether the clicking identification obtained from the broadcast data package is same as the clicking identification obtained from the data dictionary, if yes, the Bluetooth hunter corresponding to the broadcast data package which is scanned is not the Bluetooth hunter with which the user wants to match, and then returns to step 204; otherwise, the Bluetooth hunter corresponding to the broadcast data packet is the Bluetooth hunter with which the user wants to match, and executes step 212;

for instance, the clicking identification obtained from the broadcast data package is 00, and the clicking identification obtained from the data dictionary is 00, thus the clicking identifications are same as each other, which means the Bluetooth hunter corresponding to the broadcast data package is not the Bluetooth hunter with which the user wants to match;

for instance, the clicking identification obtained from the broadcast data package is 00, and the clicking identification obtained from the data dictionary is 01, thus the clicking identifications are different from each, which means the Bluetooth hunter corresponding to the broadcast data package is the Bluetooth hunter with which the user wants to match;

step 212, the mobile terminal sends the matching instruction to the Bluetooth hunter, and matches with the Bluetooth hunter.

Step 212 is specifically that the mobile terminal sends the matching instruction to the Bluetooth hunter, the mobile terminal matches with the Bluetooth hunter when the Bluetooth hunter responses to the matching instruction.

Compared with the prior art, the present embodiment has following advantages: according to the present disclosure, it provides a method for quick matching of a Bluetooth hunter, where a mobile terminal can determines automatically whether it matches with the Bluetooth hunter by the Bluetooth hunter updating the clicking identification in the broadcast data package, and there is no need for a use to filter manually, thus the method is smarter, more convenient, saves the user's time, and improves user experience. Meantime, the method does not require the user to observe a sequence number of the Bluetooth hunter which is being bond, thus, the vendor of the Bluetooth hunter does not need to print the sequence number on the Bluetooth hunter, thereby saving production costs.

Embodiment 3

Figure 3A:
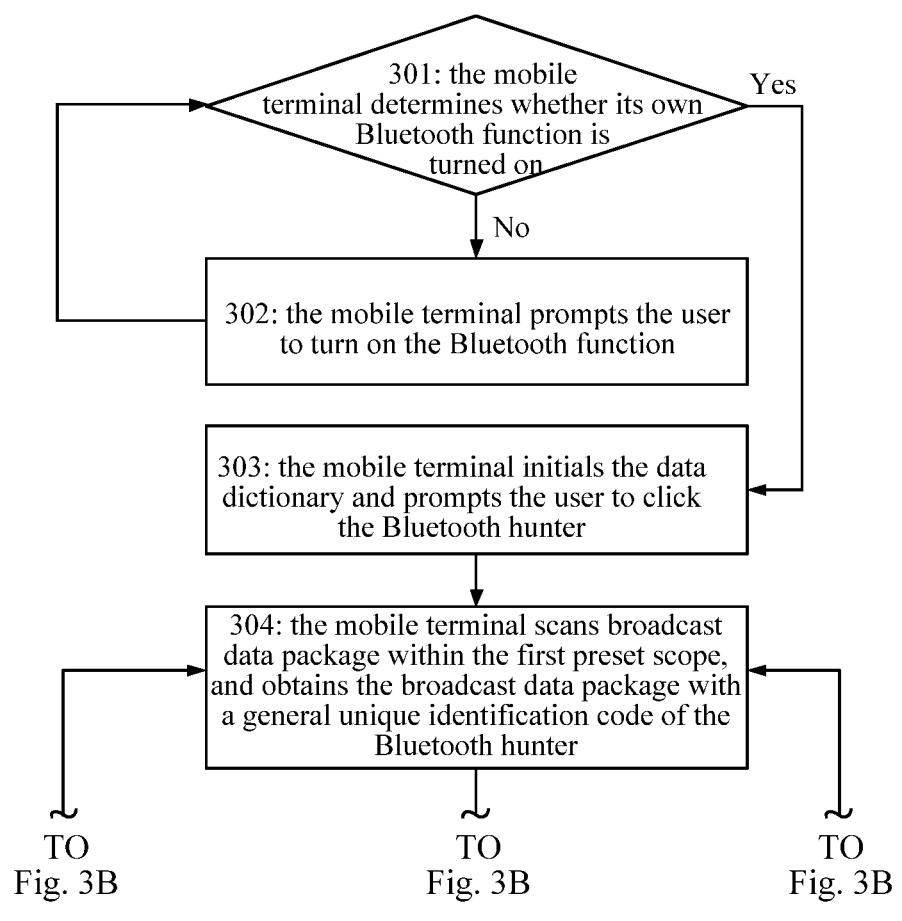
FIGS. 3A-3B are flowcharts of a method for quick matching of a Bluetooth hunter according to Embodiment 3 of the present disclosure.
Figure 3B:
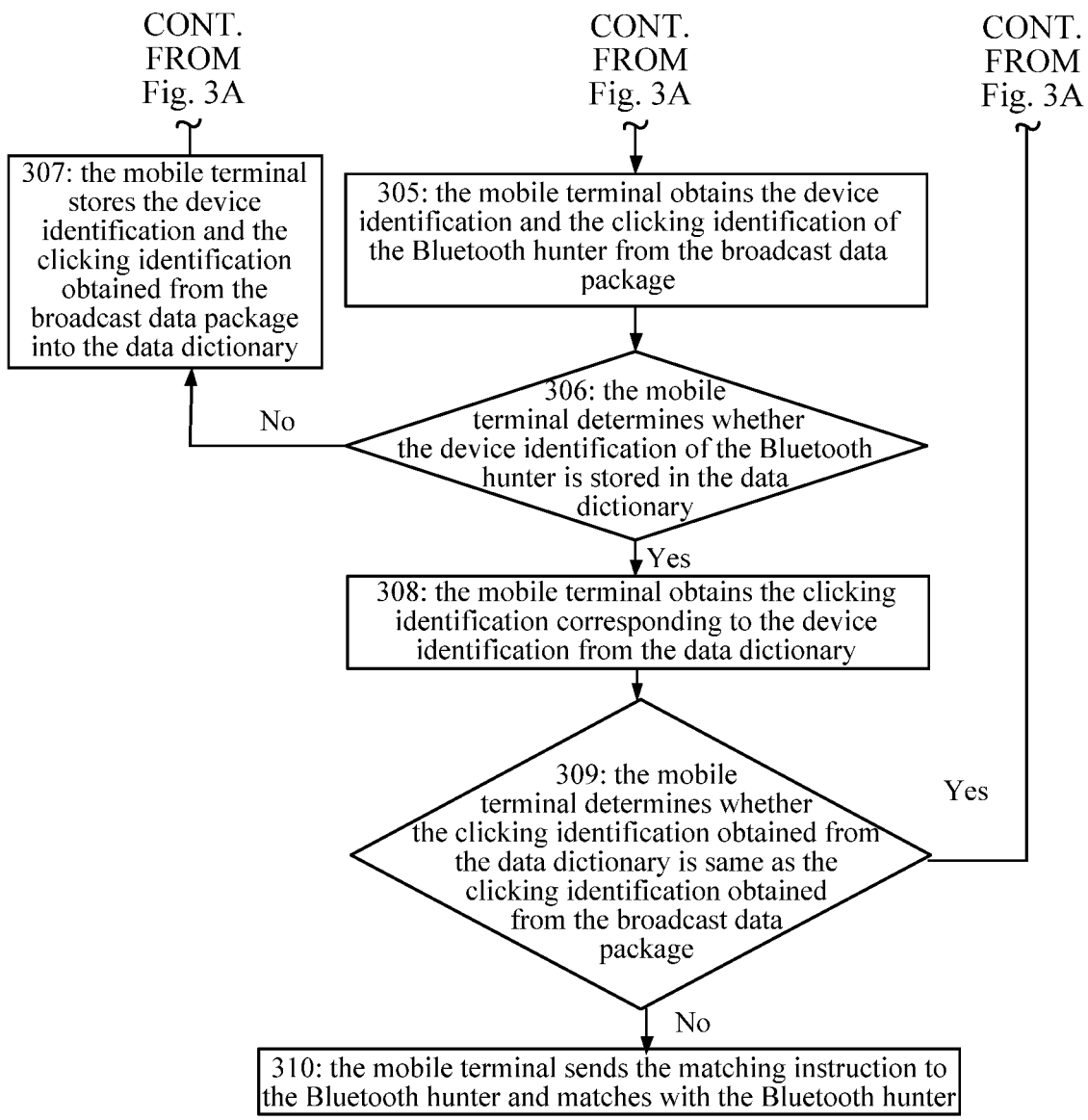

According to Embodiment 3, it provides a method for quacking match of a Bluetooth hunter, which is applied to a mobile terminal, as shown in FIGS. 3A-3B, the method includes following steps:

step 301, the mobile terminal determines whether its own Bluetooth function is turned on, if yes, executes step 303; otherwise, executes step 302;

optionally, step 301 is specifically that the mobile terminal determines whether its own Bluetooth function is turned on according to a Bluetooth state information returned by the eighth preset function, executes step 303 if turning on state information is returned; and executes step 302 if closing state information is returned;

step 302, the mobile terminal prompts the user to turn on the Bluetooth function, and returns to step 301;

optionally, the mobile terminal can prompt the user to turn on the Bluetooth function of the mobile terminal via the manner of popping up a prompt message or emitting a prompt sound;

optionally, in Embodiment 3, the mobile terminal prompts the user to turn on the Bluetooth function by the manner of popping up a prompt message;

step 303, the mobile terminal initials the data dictionary and prompts the user to click the Bluetooth hunter;

specifically, the data dictionary, which is stored in the mobile terminal, is used to store the device identification and the clicking identification of the Bluetooth hunter, the data storage structure of the data dictionary is key value pair data structure, in the key value pair data structure, a corresponding value can be searched for via a key name; thus, the storage manner of the device identification and the clicking identification of the Bluetooth hunter in the data dictionary is key value storage manner, where the device identification is stored under the key name catalogue, and the clicking identification is stored under the value catalogue corresponding to key name. In data dictionary, the clicking identification corresponding to the device identification can be obtained via searching for the device identification;

step 304, the mobile terminal scans broadcast data package within the first preset scope, and obtains the broadcast data package with a general unique identification code of the Bluetooth hunter;

specifically, the first preset scope is an effective distance of Bluetooth communication, the mobile terminal cannot scan the broadcast data package sent from the Bluetooth device when the distance between the Bluetooth device and the mobile terminal beyond the first preset scope;

specifically, in Embodiment 3, the mobile terminal filtrates the broadcast data package of the Bluetooth hunter via a preset scan filtering policy;

in Embodiment 3, the scan filtering policy is specifically that scanning parameter of the Bluetooth scanning data interface is set as the general unique identification code of the Bluetooth hunter, and the mobile terminal just obtains the broadcast data package with the general unique identification code of the Bluetooth hunter when the scanning parameter of the Bluetooth scanning data interface is set by the mobile terminal as the general unique identification code;

optionally, in Embodiment 3, step 304 is specifically the mobile terminal invokes the Bluetooth scanning data interface, sets the scanning parameter as the general unique identification code of the Bluetooth hunter, and obtains the broadcast data package of the Bluetooth hunter within the first preset scope;

for instance, in Embodiment 3, the Bluetooth scanning data interface is public void startScan(List<ScanFilter> filters, ScanSettings settings, final ScanCallback callback);

specifically, when it comes to the Bluetooth device, each service has one corresponding unique identification code which is called as the general unique identification code of the Bluetooth device, and it cannot have two different services with the same general unique identification code at the same time and at the same location, thus, the general unique identification code of the Bluetooth device can be used to distinguish a type of the Bluetooth device;

for instance, the general unique identification code of the Bluetooth hunter is FFE0; and the mobile terminal only obtains broadcast data package with FFE0 when the scanning parameter of the scanning interface is set as FFE0;

step 305, the mobile terminal obtains the device identification and the clicking identification of the Bluetooth hunter from the broadcast data package;

optionally, step 305 is specifically that the mobile terminal obtains data defined by the vendor from the broadcast data package, obtains the second preset byte data from the data defined by the vendor and marks it as the device identification, and obtains the third preset byte data from the data defined by the vendor and marks it as the clicking identification;

optionally, in Embodiment 3, both of the device identification and the clicking identification are numbers of hexadecimal, the length of the device identification is nine bytes, and the length of the clicking identification is one byte;

optionally, in Embodiment 3, the third preset byte data is data from the first byte to the ninth byte of the data defined by the vendor, thus, the device identification is the data from the first byte to the ninth byte of the data defined by the vendor;

optionally, in Embodiment 3, the mobile terminal obtaining the device identification from the broadcast data package is specifically that the mobile terminal obtains data from the first byte to the ninth byte of the data defined by the vendor;

for instance, the data defined by the vendor is 43544B4764E08EA8834764E08EA88301;

the device identification is 43544B4764E08EA883;

optionally, in Embodiment 3, the third preset byte data is the data on the last byte of the data defined by the vendor, thus, the clicking identification is the data on the last byte of the data defined by the vendor;

optionally, in Embodiment 3, the mobile terminal obtaining the clicking identification from the broadcast data package is specifically that the mobile terminal obtains the data on the last byte of the data defined by the vendor from the broadcast data package;

for instance, the data field defined by the vendor is 43544B4764E08EA8834764E08EA88301;

the clicking identification is 01;

step 306, the mobile terminal determines whether the device identification of the Bluetooth hunter is stored in the data dictionary, if yes, executes step 308; otherwise, executes step 307;

optionally, step 306 is specifically that the mobile terminal searches from the data dictionary according to the device identification obtained from the broadcast data package, determines whether the device identification of Bluetooth hunter is stored in the data dictionary, if yes, executes step 308; otherwise, executes step 307;

step 307, the mobile terminal stores the device identification and the clicking identification obtained from the broadcast data package into the data dictionary, and returns to step 304;

optionally, in Embodiment 3, the data dictionary is used to store the device identification and the clicking identification of the Bluetooth hunter, and the storage manner of the device identification and the clicking identification of the Bluetooth hunter in the data dictionary is key value pair storage manner; where the device identification of the Bluetooth hunter is key, and the device identification of the Bluetooth hunter is a value corresponding to the key;

for instance, if the device identification of the Bluetooth hunter is 43544B4764E08EA883 and the clicking identification is 01, the data stored in the key in the data dictionary is 43544B4764E08EA883, the value corresponding to the key is 01;

step 308, the mobile terminal obtains the clicking identification corresponding to the device identification from the data dictionary;

optionally, before step 308, the method further includes that the mobile terminal determines whether the clicking identification corresponding to the device identification is stored in the data dictionary, if yes, executes step 309; otherwise, the mobile terminal reports an error, and ends the procedure;

step 309, the mobile terminal determines whether the clicking identification obtained from the data dictionary is same as the clicking identification obtained from the broadcast data package, if yes, returns to step 304; otherwise, executes step 310;

optionally, in Embodiment 3, step 309 is specifically that the mobile terminal determines whether the clicking identification obtained from the broadcast data package is same as the clicking identification obtained from the data dictionary, if yes, the Bluetooth hunter corresponding to the broadcast data package is not the Bluetooth hunter with which the user wants to match, then step 304 is returned; otherwise, the Bluetooth hunter corresponding to the broadcast data package is the Bluetooth hunter with which the user wants to match, and step 310 is executed; and for instance, in the case that the clicking identification obtained from the broadcast data package is 00, and the clicking identification obtained from the data dictionary is 00, thus the clicking identifications are same as each other, which means that the Bluetooth hunter corresponding to the broadcast data package is not the Bluetooth hunter with which the user wants to match.

For instance, in the case that the clicking identification obtained from the broadcast data package is 00, and the clicking identification obtained from the data dictionary is 01, thus the clicking identifications are different from each, which means the Bluetooth hunter corresponding to the broadcast data package is the Bluetooth hunter with which the user wants to match.

Step 310, the mobile terminal sends the matching instruction to the Bluetooth hunter and matches with the Bluetooth hunter.

Optionally, step 310 is specifically that the mobile terminal sends the matching instruction to the Bluetooth hunter, and matches with the Bluetooth hunter when the Bluetooth hunter responses to the matching instruction.

Compared with the prior art, the present embodiment has following advantages: according to the present disclosure, it provides a method for quick matching of a Bluetooth hunter, where a mobile terminal can determines automatically whether it matches with the Bluetooth hunter by the Bluetooth hunter updating the clicking identification in the broadcast data package, and there is no need for a use to filter manually, thus the method is smarter, more convenient, saves the user's time, and improves user experience. Meantime, the method does not require the user to observe a sequence number of the Bluetooth hunter which is being bond, thus, the vendor of the Bluetooth hunter does not need to print the sequence number on the Bluetooth hunter, thereby saving production costs.

Embodiment 4

Figure 4:
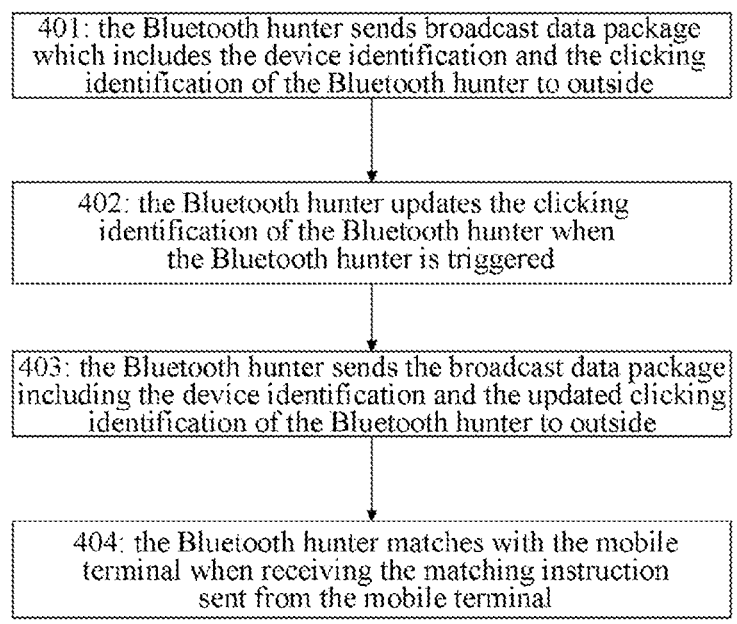
FIG. 4 is a flowchart of a method for quick matching of a Bluetooth hunter according to Embodiment 4 of the present disclosure.

According to Embodiment 4, it provides a method for quick matching of a Bluetooth hunter, which is applied to the Bluetooth hunter, as shown in FIG. 4, the method includes following steps:

step 410, the Bluetooth hunter sends broadcast data package which includes the device identification and the clicking identification of the Bluetooth hunter to outside;

where the device identification of the Bluetooth hunter corresponds to the Bluetooth hunter uniquely, the unique of the device identification of the Bluetooth hunter can make sure the mobile terminal to match with which Bluetooth hunter; and the clicking identification of the Bluetooth hunter indicates the number of times of the Bluetooth hunter being triggered after the Bluetooth hunter is turned on;

optionally, in Embodiment 4, the device identification of the Bluetooth hunter is consisted of vendor identification and an physical address of the Bluetooth hunter;

optionally, the length of the device identification of the Bluetooth hunter is nine bytes, where the length of the vendor identification is three bytes, and the length of the physical address is six bytes;

optionally, in Embodiment 4, the device identification of the Bluetooth hunter is stored in the data defined by the vendor of the broadcast data package of the Bluetooth hunter, where the data from the first byte to the third byte of the data defined by the vendor is the vendor identification of the Bluetooth hunter, and the data from the fourth byte and the ninth byte is the physical address of the Bluetooth hunter; and because the unique of the physical address of the Bluetooth hunter, the device identification of the Bluetooth hunter is also unique;

step 402, the Bluetooth hunter updates the clicking identification of the Bluetooth hunter when the Bluetooth hunter is triggered;

specifically, the Bluetooth hunter being triggered is specifically that a user triggers the Bluetooth hunter via the manner of clicking on a key of the Bluetooth hunter or touching a touching key of the Bluetooth hunter;

specifically, updating the clicking identification of the Bluetooth hunter is specifically that the Bluetooth hunter adds a preset step length to the current clicking identification in the broadcast data package to obtain updated clicking identification, and replaces the current clicking identification in the broadcast data package with the updated clicking identification;

optionally, in Embodiment 4, the clicking identification of the Bluetooth hunter has a boundary value, for instance, if the length of the clicking identification of the Bluetooth hunter is one byte, the boundary values thereof are 00 and FF;

optionally, when the number of times of the Bluetooth hunter being triggered reaches the largest boundary value, the Bluetooth hunter updating the clicking identification of the Bluetooth hunter is specifically that the Bluetooth hunter updates the current clicking identification in the broadcast data package as a smallest boundary value, for instance, if the length of the clicking identification of the Bluetooth hunter is one byte, the clicking identification in the current broadcast data package is FF, and when the Bluetooth hunter is triggered, the Bluetooth hunter updates the current clicking identification as 00;

step 403, the Bluetooth hunter sends the broadcast data package including the device identification and the updated clicking identification of the Bluetooth hunter to outside;

specifically, the mobile terminal determines whether it matches with the Bluetooth hunter according to a compared result which is obtained by comparing the updated clicking identification with the clicking identification obtained by the mobile terminal based on the device identification of the Bluetooth hunter;

step 404, the Bluetooth hunter matches with the mobile terminal when receiving the matching instruction sent from the mobile terminal.

The present disclosure provides a method for quick matching of a Bluetooth hunter, where the mobile terminal determines automatically whether it matches with the Bluetooth hunter by the Bluetooth hunter updating the clicking identification in the broadcast data package, and there is no need for a use to filter manually, thus the method is smarter, more convenient, saves the user's time, and improves user experience.

Embodiment 5

Figure 5:
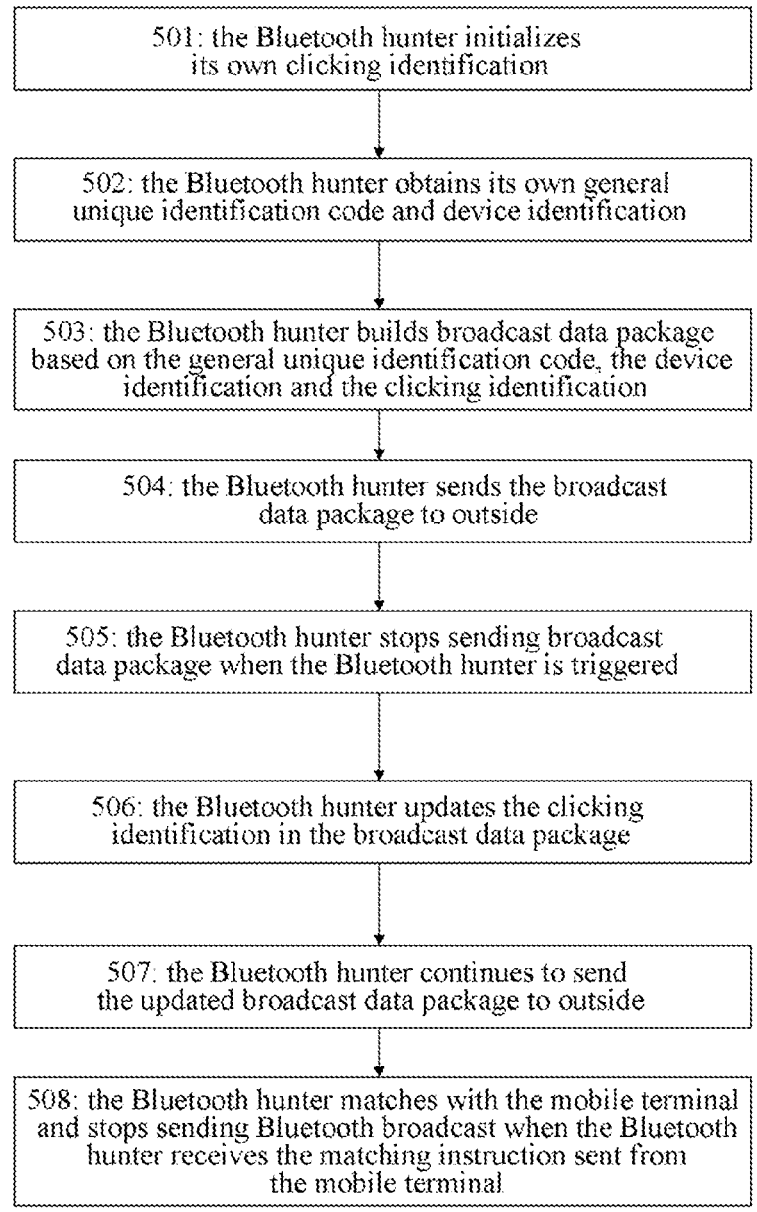
FIG. 5 is a flowchart of a method for quick matching of a Bluetooth hunter according to Embodiment 5 of the present disclosure.
Figure 6:
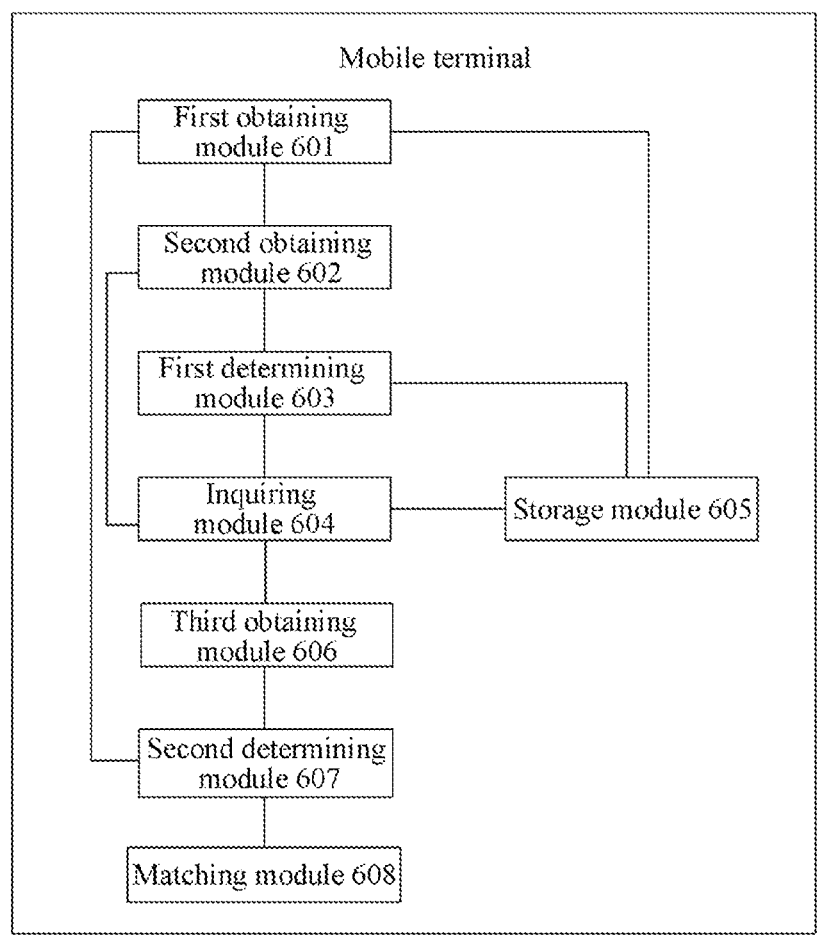
FIG. 6 is a module diagram of a mobile terminal according to Embodiment 6 of the present disclosure.
Figure 7:
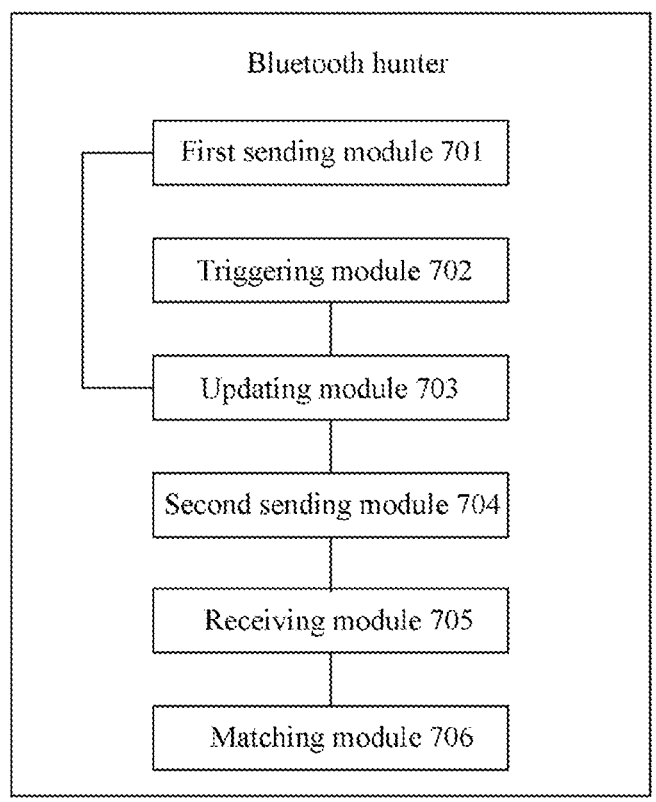
FIG. 7 is a module diagram of a Bluetooth hunter according to Embodiment 7 of the present disclosure.

According to Embodiment 5, it provides a method for quick matching of a Bluetooth hunter, which is applied to the Bluetooth hunter, as shown in FIG. 5, after the Bluetooth hunter is turned on, the method includes following steps:

step 501, the Bluetooth hunter initializes its own clicking identification;

optionally, in Embodiment 5, the clicking identification has a boundary value, for instance, if the length of the clicking identification is one byte, the boundary values of the clicking identification are 00 and FF;

optionally, in Embodiment 5, the Bluetooth hunter could initializes its own clicking identification as 00;

step 502, the Bluetooth hunter obtains its own general unique identification code and device identification;

specifically, the general unique identification code of the Bluetooth hunter is used to distinguish types of the Bluetooth devices;

specifically, the device identification of the Bluetooth hunter corresponds to the Bluetooth hunter uniquely, thus, the unique of the device identification of the Bluetooth hunter can enable the mobile terminal to determine to match with which Bluetooth hunter;

optionally, in Embodiment 5, the device identification of the Bluetooth hunter is consisted of vendor identification and physical address of the Bluetooth hunter;

optionally, the length of the device identification of the Bluetooth hunter is nine bytes, where the length of the vendor identification is three bytes, and the length of the physical address is six bytes;

optionally, in Embodiment 5, the device identification of the Bluetooth hunter is stored in data defined by the vendor of the broadcast data package of the Bluetooth hunter, where the data from the first byte to the third byte of the data defined by the vendor is the vendor identification of the Bluetooth hunter, and the data from the fourth byte to the ninth byte is the physical address of the Bluetooth hunter; because of the unique of the physical address of the Bluetooth hunter, the device identification of the Bluetooth hunter is also unique;

step 503, the Bluetooth hunter builds broadcast data package based on the general unique identification code, the device identification and the clicking identification;

specifically, in Embodiment 5, the Bluetooth hunter generates the broadcast data by using the obtained general unique identification code, the device identification and the clicking identification, and stores the broadcast data into the broadcast data package;

step 504, the Bluetooth hunter sends the broadcast data package to outside;

optionally, the broadcast data package includes the general unique identification code, the device identification and the clicking identification of the Bluetooth hunter;

step 505, the Bluetooth hunter stops sending broadcast data package when the Bluetooth hunter is triggered;

step 506, the Bluetooth hunter updates the clicking identification in the broadcast data package;

optionally, the Bluetooth hunter updating the clicking identification in the broadcast data package is specifically that the Bluetooth hunter adds a preset step length to the current clicking identification in the broadcast data package to obtain updated clicking identification, and replaces the current clicking identification in the broadcast data package with the updated clicking identification;

optionally, in Embodiment 5, in the case that the current clicking identification of the Bluetooth hunter is stored in the last byte of data defined by the vendor in the broadcast data package, and the Bluetooth hunter updating the clicking identification in the broadcast data package is specifically that the Bluetooth hunter adds the preset step length to the data on the last byte of data defined by the vendor in the broadcast data package, and updates the current clicking identification of the broadcast data package with the data, on the last byte of data defined by the vendor, which is added with the preset step length;

for instance, in Embodiment 5, the current clicking identification in the broadcast data package is 00, and the preset step length is 1, thus the updated clicking identification is 01;

step 507, the Bluetooth hunter continues to send the updated broadcast data package to outside;

specifically, the updated broadcast data package includes the general unique identification code, the device identification and the updated clicking identification of the Bluetooth hunter;

step 508, the Bluetooth hunter matches with the mobile terminal and stops sending Bluetooth broadcast when the Bluetooth hunter receives the matching instruction sent from the mobile terminal.

Optionally, step 508 is specifically that the Bluetooth hunter responses the matching instruction when it receives the matching instruction sent from the mobile terminal, matches with the mobile terminal, and stops sending Bluetooth broadcast.

The present disclosure provides a method for quick matching of a Bluetooth hunter, where the mobile terminal determines automatically whether it matches with the Bluetooth hunter by the Bluetooth hunter updating the clicking identification in the broadcast data package, and there is no need for a use to filter manually, thus the method is smarter, more convenient, saves the user's time, and improves user experience.

Embodiment 6

According to Embodiment 6, it provides a mobile terminal which is applied to Bluetooth hunter and includes:

a first obtaining module, configured to obtain broadcast data package of the Bluetooth hunter within a first preset scope;

a second obtaining module, configured to obtain device identification and clicking identification from the broadcast data package of the Bluetooth hunter obtained by the first obtaining module;

a first determining module, configured to determine whether the device identification is stored in the mobile terminal, if yes, an inquiring module is triggered; otherwise, a storage module is triggered;

the inquiring module, configured to search for the clicking identification, which is stored in itself, corresponding to the device identification, and trigger a third obtaining module;

the third obtaining module, configured to obtain the clicking identification corresponding to the device identification when the inquiring module inquires the clicking identification corresponding to the device identification;

the storage module, configured to store the device identification and the clicking identification correspondingly obtained from the broadcast data package, and the first obtaining module is triggered;

the second determining module, configured to determine whether the clicking identification obtained from the broadcast data package is same as the clicking identification corresponding to the device identification, if yes, to trigger the first obtaining module; otherwise, to trigger a matching module;

the matching module, configured to send the matching instruction to the Bluetooth hunter, and match with the Bluetooth hunter;

optionally, the second obtaining module is specifically configured to obtain data defined by the vendor from the broadcast data package of the Bluetooth hunter, and to obtain the device identification and the clicking identification from the data defined by the vendor.

Optionally, the second obtaining module obtaining the device identification from the data defined by the vendor is specifically that the second obtaining module obtains the second preset byte data from the data defined by the vendor; and the second obtaining module obtaining the clicking identification from the data defined by the vendor is specifically that the second obtaining module obtains the third preset byte data from the data defined by the vendor.

Optionally, the device identification is configured to indicate the inquiring module to search for whether the clicking identification corresponding to the device identification is stored in itself; and the clicking identification is configured to identify the number of times of the Bluetooth hunter being triggered after the Bluetooth hunter is turned on.

Optionally, in Embodiment 6, the mobile terminal further includes:

a first prompting module, configured to prompt a user to click the Bluetooth hunter.

Optionally, in Embodiment 6, the mobile terminal further includes:

a fourth obtaining module, configured to obtain the broadcast data package within the first preset scope; and a third determining module, configured to determine whether the broadcast data package is from the Bluetooth hunter, if yes, to trigger the first obtaining module; otherwise, to trigger the fourth obtaining module.

Optionally, in Embodiment 6, the mobile terminal further includes a fifth obtaining module, configured to obtain the first preset byte data from the broadcast data package;

a fourth determining module, configured to determine whether the first preset byte data is same as the vendor identification of the Bluetooth hunter stored in itself, if yes, to trigger the first obtaining module; otherwise, to trigger the fourth obtaining module;

optionally, in Embodiment 6, the mobile terminal further includes:

a fifth determining module, configured to determine whether its own Bluetooth function is turned on, if yes, to trigger the fourth obtaining module; otherwise, to trigger a second prompting module;

the second prompting module, configured to prompt the user to turn on the Bluetooth function, and to trigger the fifth determining module.

Optionally, in Embodiment 6, the mobile terminal further includes:

a preset module, configured to preset a scan filtering policy; and the first obtaining module obtaining the broadcast data package of the Bluetooth hunter within the first preset scope is specifically that the fourth obtaining module obtains the broadcast data package within the first preset scope; and the first obtaining module obtains the broadcast data package which belongs to the Bluetooth hunter according to the scan filtering policy.

Optionally, the scan filtering policy is specifically that the preset module sets the scanning parameter of the Bluetooth scan data interface as the general identification code corresponding to the Bluetooth hunter;

Optionally, the first obtaining module obtaining the broadcast data package which belongs to the Bluetooth hunter according to the scan filtering policy preset by the preset module is specifically that the first obtaining module obtains the broadcast data package with the general identification code.

Optionally, the inquiring module is further configured to report an error and end the procedure when the inquiring module does not find the clicking identifier corresponding to the device identification stored in the mobile terminal.

Optionally, the storage module storing the device identification the clicking identification correspondingly obtained from the broadcast data package is specifically that the storage module stores the device identification and the clicking identification correspondingly obtained by the second obtaining module from the broadcast data package into the data dictionary; and optionally, the storage manner of the device identification and the clicking identification obtained from the broadcast data package in the data dictionary is key value pair storage manner.

optionally, the first determining module determining whether the device identification is stored in the mobile terminal is specifically that the first determining module determines whether the device identification is stored in the data dictionary, if yes, triggers the inquiring module; otherwise, triggers the storage module.

Embodiment 7

According to Embodiment 7, it provides a Bluetooth hunter, includes:
- a first sending module, configured to send the broadcast data package which includes device identification and clicking identification of the Bluetooth hunter to outside;
- a triggering module, configured to receive triggering from outside;
- an updating module, configured to update the clicking identification of the Bluetooth hunter when the triggering module receives triggering from outside;
- a second sending module, configured to send the broadcast data package including the device identification of the Bluetooth hunter and updated clicking identification to outside;
- a receiving module, configured to receive matching instruction sent from the mobile terminal; and
- a matching module, configured to match the Bluetooth hunter with the mobile terminal when the receiving module receives the matching instruction sent from the mobile terminal.

Optionally, the device identification of the Bluetooth hunter corresponds to the Bluetooth hunter uniquely, and the device identification is configured to indicate the mobile terminal to search whether the clicking identification corresponding to the device identification is stored in the mobile terminal; and the clicking identification of the Bluetooth hunter is configured to identify a number of times of being clicked of the Bluetooth hunter.

Optionally, in Embodiment 7, the Bluetooth hunter further includes:
- an initialing module, configured to initial its own clicking identification; and
- a first organizing module, configured to build the broadcast data package based on initialized clicking identification.

Optionally, updating the clicking identification of the Bluetooth hunter is specifically that the updating module adds a preset step length to the current clicking identification in the broadcast data package to obtain updated clicking identification, and the updating module replaces the current clicking identification in the broadcast data package with the updated clicking identification.

Optionally, in Embodiment 7, the Bluetooth hunter further includes a terminal module and a second organizing module;
- the terminal module is configured to stop Bluetooth hunter sending the broadcast data package before the updating module updates the clicking identification of the Bluetooth hunter;
- the second organizing module is configured to build the broadcast data package of the device identification of the Bluetooth hunter and the updated clicking identification after the updating module updates the clicking identification of the Bluetooth hunter;
- the second sending module is configured to send the broadcast data package which includes the device identification of Bluetooth hunter and the updated clicking identification to outside; and
- optionally, the broadcast data package further includes a general identification code of the Bluetooth hunter.

The above are only the preferred specific embodiments of the present disclosure, but the protection scope of the present disclosure is not limited thereto. Changes or substitutions can be easily thought of by any person skilled in the art within the technical scope disclosed by the present disclosure should be covered within the protection scope of the present disclosure. Therefore, the protection scope of the present disclosure should be subject to the protection scope of the claims.

The invention claimed is:

1. A method for quick matching of a Bluetooth hunter, which is applied to a mobile terminal, the method comprising:
   - step S1, obtaining, by the mobile terminal, broadcast data package of the Bluetooth hunter within a first preset scope, and obtaining device identification and clicking identification from the broadcast data package, wherein the device identification is used to indicate the mobile terminal to search whether the clicking identification corresponding to the device identification is stored in itself; and the clicking identification is used to indicate a number of times for the Bluetooth hunter being triggered after it is turned on;
   - step S2, determining, by the mobile terminal, whether the device identification is stored in itself, and executing step S3 if the device identification is stored in itself; otherwise, executing step S4;
   - step S3, searching for, by the mobile terminal, and obtaining the clicking identification, which is stored in itself, corresponding to the device identification, and executing step S5;
   - step S4, storing, by the mobile terminal, the device identification and the clicking identification correspondingly which are obtained from the broadcast data package, and returning to step S1;
   - step S5, determining, by the mobile terminal, whether the clicking identification obtained from the broadcast data package is same as the clicking identification, which is stored in itself, corresponding to the device identification, and returning to step S1 if the clicking identification obtained from the broadcast data package is same as the clicking identification, which is stored in itself, corresponding to the device identification; otherwise, executing step S6; and
   - step S6, sending, by the mobile terminal, a matching instruction to the Bluetooth hunter, and matching with the Bluetooth hunter;
   - wherein the clicking identification, which is stored in the terminal device, corresponding to the device identification, is a clicking identification that broadcasted by the Bluetooth hunter when the Bluetooth hunter has not been triggered, and the step S5 specifically comprises:
   - determines, by the mobile terminal, whether the clicking identification obtained from the broadcast data package is the clicking identification that broadcasted by the Bluetooth hunter when the Bluetooth hunter has not been triggered; if so, determining that the Bluetooth hunter is not the Bluetooth hunter that a user wants to match with, returning to step S1; if not, determining that the clicking identification obtained from the broadcast data package is an updated clicking identification after the Bluetooth hunter being triggered, and the Bluetooth hunter is the Bluetooth hunter that the user wants to match with; and executing step S6;
   - wherein before step S1, the method further comprises:
   - prompting, by the terminal device, the user to trigger the Bluetooth hunter.

2. The method for quick matching of a Bluetooth hunter according to claim 1, wherein the step S1 further comprises that the mobile terminal obtains data defined by a vendor from the broadcast data package of the Bluetooth hunter, and the mobile terminal obtains the device identification and the clicking identification from the data defined by the vendor.

3. The method for quick matching of a Bluetooth hunter according to claim 1, wherein the mobile terminal obtaining the broadcast data package of the Bluetooth hunter within the first preset scope in step S1 comprises:
step A1, obtaining, by the mobile terminal, the broadcast data package within the first preset scope; and
step A2, determining, by the mobile terminal, whether the broadcast data package is from the Bluetooth hunter, executing step S1 if the broadcast data package is from the Bluetooth hunter; otherwise, returning to step A1.

4. The method for quick matching of a Bluetooth hunter according to claim 3, wherein step A2 comprises:
step B1, obtaining, by the mobile terminal, a first preset byte data from the broadcast data package; and
step B2, determining, by the mobile terminal, whether the first preset byte data is same as a vendor identification of the Bluetooth hunter stored in itself, and executing step S1 if the first preset byte data is same as the vendor identification of the Bluetooth hunter stored in itself; otherwise, returning to step A1.

5. The method for quick matching of a Bluetooth hunter according to claim 3, wherein before step A1, the method further comprises:
step C1, determining, by the mobile terminal, whether its own Bluetooth function is turn on, executing step A1 if its own Bluetooth function is turn on; otherwise, executing step C2; and
step C2, prompting, by the mobile terminal, a user to turn on the Bluetooth function, and returning to step C1.

6. The method for quick matching of a Bluetooth hunter according to claim 1, wherein the mobile terminal obtaining the broadcast data package of the Bluetooth hunter within the first preset scope is that:
step H1, obtaining, by the mobile terminal, the broadcast data package within the first preset scope; and
step H2, obtaining, by the mobile terminal, the broadcast data package which belongs to the Bluetooth hunter via a preset scan filter policy.

7. The method for quick matching of a Bluetooth hunter according to claim 6, wherein the scan filter policy in step H2 is specifically that the mobile terminal sets a scanning parameter of a Bluetooth scanning data interface as a general identification code corresponding to the Bluetooth hunter; and the step H2 is that the mobile terminal obtains the broadcast data package with the general identification code.

8. The method for quick matching of a Bluetooth hunter according to claim 1, wherein step S3 further comprises: reporting an error and ending the procedure in the case that the mobile terminal does not find the clicking identification, which is stored in itself, corresponding to the device identification.

9. The method for quick matching of a Bluetooth hunter according to claim 1, wherein in step S4, the mobile terminal stores the device identification and the clicking identification correspondingly, which are obtained from the broadcast data package, in a data dictionary; and storage manner of the device identification and the clicking identification, which are obtained from the broadcast data package, in the data dictionary is key value pair storage manner.

10. The method for quick matching of a Bluetooth hunter according to claim 1, wherein the clicking identification of the Bluetooth hunter is updated when the Bluetooth hunter is triggered.

11. The method for quick matching of a Bluetooth hunter according to claim 10, wherein the clicking identification of the Bluetooth hunter is updated by adding a preset step length to a current clicking identification in the broadcast data package to obtain an updated clicking identification, and replacing the current clicking identification in the broadcast data package with the updated clicking identification.

12. The method for quick matching of a Bluetooth hunter according to claim 11, wherein the updated clicking identification is used to compare with the clicking identification obtained by the mobile terminal based on the device identification of the Bluetooth hunter, enabling the mobile terminal to determine whether to match with the Bluetooth hunter according to a compared result.

13. The method for quick matching of a Bluetooth hunter according to claim 1, wherein the Bluetooth hunter being triggered specifically is:
triggering, by the user, the Bluetooth hunter via clicking on a key of the Bluetooth hunter or touching a touching key of the Bluetooth hunter.

* * * * *